United States Patent [19]

Seale et al.

[11] 4,250,111
[45] Feb. 10, 1981

[54] MIXED CATALYST FOR THE HYDROLYSIS OF NITRILES TO AMIDES

[75] Inventors: Virgil L. Seale, Houston, Tex.; Louis A. Goretta, Naperville, Ill.

[73] Assignee: Nalco Chemical Company, Oak Brook, Ill.

[21] Appl. No.: 704,170

[22] Filed: Jul. 12, 1976

Related U.S. Application Data

[63] Continuation-in-part of Ser. No. 676,541, Apr. 12, 1976, abandoned, which is a continuation-in-part of Ser. No. 490,920, Jul. 22, 1974, abandoned, which is a continuation-in-part of Ser. No. 260,263, Jun. 6, 1972, abandoned.

[51] Int. Cl.³ .......................................... C07C 102/08
[52] U.S. Cl. .................................. 564/129; 252/463; 252/476; 252/477 Q; 564/131
[58] Field of Search .......... 260/557 R, 558 R, 561 W; 252/463, 476, 477 Q

[56] References Cited

U.S. PATENT DOCUMENTS

| | | | |
|---|---|---|---|
| 3,597,481 | 8/1971 | Tefertiller et al. | 260/561 N |
| 3,631,104 | 12/1971 | Habermann et al. | 260/561 N |
| 3,642,643 | 2/1972 | Habermann | 260/561 N |
| 3,642,894 | 2/1972 | Habermann et al. | 260/561 N |
| 3,696,152 | 10/1972 | Habermann et al. | 260/561 N |
| 3,789,074 | 1/1974 | Seale et al. | 260/561 N |
| 3,791,991 | 2/1974 | Seale et al. | 260/561 N |

FOREIGN PATENT DOCUMENTS 2256238  5/1973  Fed. Rep. of Germany .

*Primary Examiner*—Curtis R. Davis
*Attorney, Agent, or Firm*—Henry L. Brinks

[57] ABSTRACT

An improved process for catalytically hydrolyzing a nitrile to a corresponding amide which employs a reduced copper and another reduced metal catalyst. This catalyst is prepared by precipitating from an aqueous solution comprised of a mixture of a copper salt and a heavy metal salt a mixture of copper hydroxide and heavy metal hydroxide, oxidizing, heating, washing, separating and reducing under controlled conditions.

12 Claims, No Drawings

MIXED CATALYST FOR THE HYDROLYSIS OF NITRILES TO AMIDES

This application is a continuation-in-part of U.S. Ser. No. 676,541 filed Apr. 12, 1976 now abandoned, which was a continuation-in-part application of U.S. Ser. No. 490,920 filed July 22, 1974 now abandoned, which was a continuation-in-part application of U.S. Ser. No. 260,263, filed June 6, 1972 now abandoned.

BACKGROUND OF THE INVENTION

The hydrolysis of nitriles to form the corresponding amides in the presence of acids and bases is well known to those skilled in the art as noted in U.S. Pat. No. 3,381,034. The prior art teaches the use of copper-copper ion catalysts, reduced copper oxide catalysts, reduced copper-chromium or copper-molybdenum oxide catalyst and other catalysts composed of heavy metals such as zinc, cadmium, chromium and silver. See, for example, U.S. Pat. Nos. 3,381,034; 3,631,104; 3,597,481; 3,642,894; 3,767,706; and 3,642,643; Belgian Pat. No. 768,658; German Pat. No. 2,036,126; German DOS No. 2,164,185; Canadian Pat. No. 899,380; and Japanese Patent Publication No. 69/5205.

BRIEF SUMMARY OF THE INVENTION

The present invention involves a process for preparing a catalyst useful in the hydrolysis of a nitrile to the corresponding amide in the presence of water. The catalyst is prepared by reduction of copper and another metal from aqueous solution of soluble copper and other metal compounds. The catalyst more specifically is formed by the coprecipitation of copper hydroxide and another metal hydroxide followed by oxide formation, an optional drying step, and finally reduction.

It is a primary aim of this invention to provide a process for catalytically hydrolyzing a nitrile to the corresponding amide under aqueous liquid phase conditions using a catalyst composition which is novel in the art. The process is particularly useful for hydrolyzing acrylonitrile to acrylamide.

Other and further aims, objects, purposes, advantages, utilities and features will be apparent to those skilled in the art from a reading of the present specification.

DETAILED DESCRIPTION

The catalyst useful in the present process for hydrolyzing a nitrile to the corresponding amide is formed by reduction of copper and another metal from aqueous solution of soluble copper and other metal compounds by following a series of steps. Thus, initially, one dissolves in water preferably from about 15 to 35 percent by weight of a water soluble copper salt (preferably inorganic) and preferably from about 1.0 to 10.0 percent by weight of at least one water soluble salt (preferably inorganic) of a first row (referring to the Periodic Table of the the Elements) non-copper transition metal (scandium, titanium, vanadium, chromium, manganese, iron, cobalt, nickel, and zinc), of a rare earth metal (the metallic elements having atomic numbers 57 through 71 of the Period Table), and of aluminum. Preferred metal salts include iron, nickel, aluminum, lanthanum, cobalt, manganese, and zinc.

Such water soluble copper salt and such metal salt may be individually prepared in solution form and then mixed together or alternatively (preferably) the mixed salt aqueous solution is prepared in a single vessel. In such mixed solution, the weight ratio of other metal to copper ranges from about 1:250 to 10:100 which is a range of about 0.4% to 10% by weight of the other metal based on combined weight of copper and the other metal. At least 90 weight percent of the total copper present is in the form of cupric ions in such solution. Preferably, all of the salt-starting materials are chemically pure.

To such mixed salt solution, one adds ammonia (ammonium hydroxide) in an amount sufficient to turn the mixed salt solution a blue color and also cause the formation of an initial partial precipitate which is typically mixed metal hydroxides. In general, the total quantity of ammonia charged to the mixed solution of copper and metal ions is sufficient to achieve in the resulting mixture a mole ratio of ammonia to copper ranging from about 0.25 to 0.5 (based on the total copper present). The precipitate formed at this point is typically bluish to white in appearance.

Next, one adds to the resulting aqueous system containing such initial precipitate from about 20 to 100 percent by weight based on the total copper present in the system of alkali metal hydroxide addition substantially completely precipitates the mixed salts to form mixed copper hydroxide metal hydroxides. In general, the total quantity of alkali metal hydroxide charged to the mixed solution containing copper and ammonia is sufficient to achieve in the resulting mixture a mole ratio of alkali metal hydroxide to copper ranging from about 2 to 2.5 (based on the total copper present).

Next, one heats the resulting system so as to cause the precipitate thus formed to be substantially completely converted to the oxide form (which is black in color) from the initial light blue to white color. The temperature used for heating can range from about 55° to 105° C., though temperatures in the range of from about 65° to 90° are presently preferred. The time of heating can range from about ¼ to 8 hours, though times of from about 1½ to 5 hours are generally suitable. In general, the time of heating is at least sufficient to produce a black precipitate, and preferably the time of heating extends beyond the first appearance of the black precipitate so as to insure a substantially complete conversion of precipitate to the oxide form.

After heating, it is convenient to cool the so-converted system including the precipitate to ambient temperature, though such cooling is not necessary. Thereafter, the entire system is conveniently subjected to separation as by filtration, centrifugation, or settling and decanting (filtration being presently preferred). Conveniently, nothing is removed from the reaction vessel until after the heating operation is completed.

The separated precipitate is washed with water (preferably deionized or distilled water) to reduce the pH (as conveniently measured using the wash water) down to a level which is below about 10 but yet preferably above about 7.5. Preferably, the pH is in the range of from about 8 to 9.5.

Next, the so-washed precipitate is optionally dried at temperatures ranging from about room up to 200° C. A preferred drying temperature range presently being from about 80° to 120° C. and a most preferred drying temperature preferably being about 100° C. The dried powder is frangible and fine. This drying step may be eliminated.

The next step is the reduction of the so washed precipitate (whether or not dried) with hydrogen. Reduction with hydrogen is preferably carried out under aqueous liquid phase conditions with the aid of catalyst. The catalyst is preferably a nobel metal (e.g. palladium, platinum, rhthenium, iridium, rhodium and osmium), or rhenium. The catalyst is typically supported conventionally on a material such as charcoal, silica, alumina, or the like. Typically, the catalyst support material comprises from about 90 to 95 percent of the total weight of a given catalyst with the balance up to 100 weight percent thereof being the catalyst metal. Preferably, the catalyst is in the form of a powder whose average particle size is below about 200 mesh. Conventionally prepared supported noble metal catalyst in a finely divided form can be conveniently used, as those skilled in the art will appreciate, such materials being available commercially. It is preferred to reduce the metal oxide at temperatures below about 60° C., though hydrogenation temperatures ranging from about 0° to 150° C. can conveniently be employed. Use of temperatures below about 60° C. appears to produce some enhancement of initial catalyst activity in a catalyst prepared as taught herein.

The formation of a mixed copper/metal aqueous solution is conveniently accomplished using conventional dissolution procedures. The copper salts useful in this invention are cupric containing compounds which are soluble in water and form cupric cations in aqueous solution. Characteristically, such copper salts are acidic in aqueous solution. Copper salts useful in this invention are preferably inorganic and are discussed, for example, in "Qualitative Analysis" by Moeller. Examples of suitable copper salts include $CuSO_4$, $Cu(NO_3)_2.3H_2O$, $CuSO_4.5H_2O$, $CuCl_2$ and the like. Copper sulfates are presently most preferred copper salts.

The salts of metals such as zinc, iron, aluminum, nickel, manganese, cerium, cobalt and the like among the first row transitional metals and the rare earths are also water soluble and form their respective cations in aqueous solution. Preferably, such salts are inorganic and typical suitable such salts have anions such as sulfate, nitrate, halide and the like. Most preferred metal compounds include presently ferrous sulfate, zinc, nitrate, zinc sulfate, ceric ammonium sulfate, and the like. A presently most preferred compound is ferrous sulfate.

The relative concentration of metal salt present in a starting mixed salt solution influences the conversion rate associated with a catalyst prepared as taught by this invention when used in the hydrolysis of nitrile to amide in accord with the process of this invention. A presently most preferred concentration for metal salt in a starting solution is about 1 percent by weight based on copper oxide.

As indicated, once the mixed salt solution is initially prepared, an initial precipitate is formed by the addition of ammonium hydroxide. The amount of ammonium hydroxide employed is variable, depending upon the types of starting salts employed and their relative concentrations. Typically and preferably, the concentration of ammonium hydroxide ranges from about 1 to 5 weight percent based on the total metal and copper salt content of the system to which the ammonium hydroxide is added.

The precipitation of the metals from solution by the invention is completed by the addition of an alkali metal hydroxide aqueous solution to the initial partially precipitated system. Typically, from about 20 to 200 percent by weight based on the copper containing compound in the starting mixed salt solution of alkali metal hydroxide is added. A complete precipitate forms almost immediately and settles to the bottom of the reaction vessel if mixing is stopped. The complete precipitate thus formed is a mixture of copper hydroxide and metal hydroxide. For example, if copper sulfate and ferric nitrate are used, the precipitate is composed of copper hydroxide and ferric hydroxide. Typical alkali or alkaline earth metal hydroxides which may be used for such precipitation include those of sodium, pottassium, and calcium. Alkali metal hydroxides are preferred, and, among such hydroxides, sodium and pottassium hydroxides are preferred. The cupric hydroxide is formed by the addition of alkali metal hydroxide to a copper ammonium complex ion formed by the addition of ammonium hydroxide to the mixed solution of copper salt and metal salt. See, for example, Rowe U.S. Pat. No. 2,474,497.

After complete precipitation, the system is heated at, as indicated, a temperature ranging from about 55° to 105° C. for times ranging from about ½ to 8 hours. A presently most preferred heating temperature is about 70° C. and a presently most preferred heating time is about four hours. During this heating step, the copper hydroxide is converted into copper oxide, and the metal hydroxide may be only partially converted into a metal oxide, so that there may be present (the exact chemical composition of the mixture being presently unknown) both noncopper metal hydroxide and noncopper metal oxide, such as, for example, ferric hydroxide and ferric oxide.

After the conversion to the oxide form is completed. The reaction mixture may be optionally concentrated by removing a portion of the water. Such water removal is conveniently accomplished, for example, by fitting the reaction vessel with a condenser and heating the mixture at reflux temperatures to remove from about ⅛ to ½ of the residual water by distillation. Optionally, after the mixture has been concentrated, it is cooled to ambient temperatures.

After separation of solids, as by filtration or the like, to recover the solid, dark colored precipitate, such precipitate is water washed. Any conventional washing procedure may be used. The water wash may, for example, be two sequential treatments with deionized water, each treatment being followed by filtration, if desired.

If to be dried, the precipitate is conveniently placed in an oven at a temperature in the range of from about 70° to 120° C. for a time of from about one to two hours.

The precipitate is then reduced to produce a finished catalyst. A conventional reduction procedure may be employed as those skilled in the art will appreciate, but a preferred reduction procedure for use in the process of this invention involves the addition of an oxide precipitate prepared as described herein to water in a weight ratio of from about 1:10 to 1:20, the water preferably being maintained at a pH in the range of from about 9 to 10. Using a noble metal catalyst as hereinabove indicated, and, having a catalyst metal loading of at least about 0.02 (preferably about 0.05 to 0.1) weight percent based upon the total weight of precipitate (dry weight basis) present, and using an initial hydrogen pressure of at least about 10 psig (preferably about 30-500 psig), the reduction proceeds at temperatures ranging from about 0° to 100° C., ambient temperatures being typical. Typical reduction times range from about 1 to 3 hours or until reduction is substantially complete. Termination of reduction can be observed by the achieval of steady state pressure conditions in a reaction zone.

A catalyst prepared as herein described if not promptly used for hydrolysis of nitrile to amide in accordance with the teachings of this invention is preferably stored under water to minimize exposure to oxygen.

The nitriles useful in the practive of the present invention may be any aliphatic or aromatic nitriles containing up to about 20 or more carbon atoms per molecule. Preferred nitriles useful in the practice of this invention are olefinic nitriles containing from 3 to 6 carbon atoms per molecule (3 or 4 carbon atoms per molecule being more preferred) with acrylonitrile being a presently most preferred nitrile. Examples of suitable nitriles include acetonitrile, propionitrile, valeronitrile, adiponitrile, methacrylonitrile, crotononitrile, maleonitrile, fumaronitrile, and the like.

In the hydrolysis process of this invention, a starting composition typically comprises from about 10 to 75 percent of one or more of such nitrile compounds with the remainder up to 100 weight percent thereof being water. Preferably, such a composition contains from about 30 to 40 weight percent of a nitrile, such as acrylonitrile (same basis). The process is conducted under aqueous liquid phase conditions using temperatures in the range of from about 50° to 150° C. with temperatures of from about 60° to 125° C. being presently preferred.

The hydrolysis reaction proceeds even when the amount of the catalyst employed is very slight. For example, addition of a catalyst as taught by this invention in an amount of about 0.01 gram per mole of acrylonitrile is sufficient to make the reaction proceed. The greater the amount of catalyst used, the faster the reaction proceeds, in general, thus permitting an increase in the amount of aliphatic amide, such as acrylamide, produced. Consequently, the amount of catalyst employed per mole of, for example, acrylonitrile, initially employed can preferably range from about 0.01 to 100 grams, although more or less catalyst can be used, if desired.

Acrylamide may be made from a mixture of acrylonitrile and water in accordance with the teachings of the present invention using a suspension bed or fixed bed of such catalyst. Combinations thereof may be employed. Two or more reactors may be connected in series and the reactant liquid and the catalyst may be countercurrently moved relative to each other to effect and enhance reaction.

The hydrolysis process may be practiced under atmospheric conditions, but superatmospheric and subatmospheric pressures may be employed. Batch processing may be used, but continuous is preferred.

The hydrolysis process of the present invention may be practiced using a copper catalyst prepared as described herein utilizing a suspension bed system in which event it is preferred to employ the catalyst in the form of particles at least 90 percent of which are in an average size range of from about 0.002 to 0.01 inch. Similarly, when the present invention is practiced using such a doped, reducing copper catalyst, in the form of a fixed bed system, it is convenient and preferred to use the catalyst in the form of particles at least 90 percent by weight of which range in average size from about 0.02 to 0.05 inch.

The larger-sized particles can be produced by conventional pelletizing procedures. Those skilled in the art will appreciate that a catalyst prepared as taught herein may undergo further preparation by procedures known to the prior art, as desired, before being utilized in a hydrolysis process as taught herein.

The concentration of nitrile in a starting mixture of nitrile and water intended for use in the practice of the process of the present invention can be in the form of two distinct liquid phases, caused by the fact that, at relative high concentrations, the percent of nitrile used may be such that miscibility of the nitrile with water is not physically possible.

Preferably, one uses less than a 50:1 molar excess of water to nitrile in the nitrile hydrolysis process.

Preferably, the concentration of ammonia in an ammonium hydroxide aqueous solution added to a mixed salt starting soludtion ranges from about 3 to 28 weight percent based on total weight of such an ammonium hydroxide solution so added (about 5 to 25 weight percent being presently preferred), the quantity of ammonium hydroxide so mixed being sufficient to effect only a partial precipitation of said salts in a starting mixed salt solution. Also, preferably, the concentration of alkali metal hydroxide in an alkali metal hydroxide solution added to an ammonium hydroxide treated mixed salt starting solution ranges from about 3 to 35 weight percent based on total weight of such an alkali metal hydroxide solution so added (about 5 to 25 weight percent being presently preferred). A presently most preferred alkali metal hydroxide is solium hydroxide. The exact amount of alkali metal hydroxide so added is sufficient to effect a substantially complete precipitation of all metal cations present initially in a starting mixed salt aqueous solution, as indicated.

EMBODIMENTS

The present invention if further illustrated by reference to the following Examples. Those skilled in the art will appreciate that other and further embodiments are obvious and within the spirit and scope of this invention from the teachings of these present Examples taken with the accompanying specification.

EXAMPLE I

To a 5-liter three-neck flask fitted with a stirrer, thermometer and reflux condenser are added 485 grams of Cu (NO$_3$)$_2$.3H$_2$O and 1500 ml of deionized water. The copper nitrate is mildly agitated until it is throughly dissolved in the water. The 4.5 grams of Zn(NO$_3$)$_2$.6-H$_2$O are added and 50 ml of a 28% solution of NH$_4$OH are added. The total quanity of ammonia charged to the mixed solution of copper and zinc ions is sufficient to achieve in the resulting mixture a mole ratio of ammonia to copper of about 0.37 to 1 (based on the total copper present). Mixing is continued until a homogeneous mixture is obtained. To this mixture is added 165 grams of sodium hydroxide pellets which are dissolved in 1500 ml of deionized water. This sodium hydroxide solution is added over a ten-minute period with mild agitation. The total quantity of alkali metal hydroxide charged to the mixed solution containing copper, ammonia and zinc is sufficient to achieve in the resulting mixture a mole ratio of alkali metal hydroxide to copper of about 2.05 to 1 (based on the total copper present). Mixing is continued for an additional 10 minutes by which time all of the copper hydroxide and zinc hydroxide precipitate is formed. The mixture is heated at 70° C. for one hour. The apparatus is then fitted with a distillation condenser and the temperature is raised to approximately 100° C. and 500 ML of water is distilled from the mixture. The distillation time is approximately one hour. After the water is distilled off, the mixture is cooled to 90° C. The precipitate is isolated by filtration using millipore filter paper in a Buchner funnel. Once the aqueous solution is drained from the solid precipitate, about 500 ML of water is poured into the Buchner funnel and allowed to drain through the filter. An additional 500 ml of deionized water is poured into the Buchner funnel and allowed to pass through the filter. The solid precipitate is then removed from the filter paper and oven dried at 110° C. for one hour.

At this time, 53 grams of the precipitate are added to 880 ml of deionized water containing 0.5 grams of a catalyst composed of 10% palladium on powdered charcoal. The pH of this mixture is adjusted to approximately 10.5 with dilute caustic. This mixture is mildly agitated for four hours at 26° C. in a hydrogen atmosphere.

At the end of this reduction step, 420 grams of acrylonitrile is added to the mixture as prepared above. The mixture is heated to 108° C. for eight hours. The resulting solution is analyzed for acrylamide with the result being that the yield is 80%.

EXAMPLE 2

The procedure of Example 1 is performed using different reactants and concentrations for several other examples.

To a 5-liter three-neck flask fitted with a stirrer, reflux condenser, and a thermometer is added 500 grams of $Cu(SO_4).5H_2O$ and 1500 ml of water. When the copper sulfate is dissolved in the water, 7.5 grams of $FeSO_4.4H_2O$ are added to the solution as well as 50 ml of a 28% solution of $NH_4OH$. The total quantity of ammonia charged to the mixed solution of copper and iron ions is sufficient to achieve in the resulting mixture a mole ratio of ammonia to copper of about 0.37 to 1 (based on the total copper present). The mixture is stirred for five minutes at which time 170 grams of sodium hydroxide pellets dissolved in 1500 ml of deionized water are added to the mixture over a 10-minute period. The total quantity of alkali metal hydroxide charged to the mixed solution containing copper, ammonia and iron is sufficient to achieve in the resulting mixture a mole ratio of alkali metal hydroxide to copper of about 2.1 to 1 (based on the total copper present). A solid precipitate is formed and the temperature of the mixture is raised to 70° C. and held for one hour. The apparatus is then fitted with a distillation condenser and the temperature raised to reflux temperature to remove 495 ml of distillate. The mixture is then cooled, filtered and washed as was performed in Example 1. The solid precipitate is isolated and oven dried at 110° C. for one hour.

53 grams of the solid precipitate are added to 880 ml of deionized water which contains 1 ml of a 28% solution of ammonium hydroxide and 0.5 gram of 10% palladium on powdered charcoal catalyst. This composition if allowed to stir for three hours in a hydrogen atmosphere at which time the reduction is completed. The calculated percent by weight of reduced iron based on combined weight of reduced copper and reduced iron present in the catalyst is 1.15%.

To the mixture prepared above, 420 grams of acrylonitrile are added and the temperature is increased to 108° C. by use of a steam bath and the reaction proceeded for seven hours. The reaction mix is cooled to ambient temperature and an analysis is performed to determine the conversion of acrylonitrile to acrylamide. The yield is 82%.

EXAMPLE 3

A reaction procedure is followed as in Examples 1 and 2 using 500 grams of copper sulfate pentahydrate, 1500 ml of deionized water, 4 grams of $FeSO_4.7H_2O$ and 50 ml of 28% $NH_4OH$.

This is followed by the addition of 300 grams of a 50% NaOH solution. The total quantity of ammonia charged to the mixed solution of copper and iron ions is sufficient to achieve in the resulting mixture a mole ratio of ammonia to copper of about 0.37 to 1 (based on the total copper present). The total quantity of alkali metal hydroxide charged to the mixed solution containing copper, ammonia and iron is sufficient to achieve in the resulting mixture a mole ration of alkali metal hydroxide to copper of about 1.95 to 1 (based on the total copper present).

The catalyst is isolated and 53 grams is added to 880 ml of deionized water, 0.5 gram of 10% palladium on powdered charcoal catalyst and the pH adjusted to 10 to 10.5 with dilute caustic. The reduction is performed as in Examples 1 and 2. The calculated percent by weight of reduced iron based on combined weight of reduced copper and reduced iron present in this catalyst is 0.63%. 420 grams of acrylonitrile is added and heated to 11° C. for four hours. The yield is 73%.

EXAMPLE 4

250 grams of $CuSO_4.5H_2O$ are dissolved in 1500 ml deionized water. 100 ml of 28% $NH_4OH$ are added to the solution. The total quantity of ammonia charged to the mixed solution of copper and copper ions is sufficient to achieve in the resulting mixture a mole ration of ammonia to copper of about 0.735 to 1 (based on the total copper present). 80 grams of sodium hydroxide pellets are dissolved in 500 ml of deionized water, the resulting caustic solution added to the reaction mix. The total quantity of alkali metal hydroxide charged to the mixed solution containing copper is sufficient to achieve in the resulting mixture a mole ration of alkali metal hydroxide to copper of about 2 to 1 (based on the total copper present). The resulting mixture is heated at 70° C. for one hour. The resulting precipitate is filtered, washed and isolated as in the previous examples. The precipitate is oven dried at 110° C. for one hour.

53 grams of the precipitate solid are added 880 ml of deionized water, 0.5 gram of 10% palladium on powdered charcoal catalyst and 0.5 ml of 28% ammonium hydroxide. To the reduced catalyst 420 grams of acrylontrile are added and the reaction proceeded at 109° C. for twelve hours. The conversion is 5%.

When in each of Examples 1 through 4 there is used in place of acrylonitrile the following respective nitriles, similar conversions to the corresponding amide in each case are obtained: methacrylonitrile, acetonitrile, maleonitrile, benzonitrile and crotonic nitrile.

EXAMPLES 5-9

500 grams of $CuSO_4.5H_2O$ is dissolved in 1500 ml of deionized water. The solution is heated to 35° to 40° C. and the metal salt is added and dissolved therein.

The metal salts used in separate, respective batches of such a copper sulfate solution are:

(a) 3 grams of $FeSO_4.7H_2O$
(b) 4 grams of $La(NO_3)_3.6H_2O$
(c) 8 grams of $Al_2(SO_4)_3.18H_2O$ (d) 3.1 grams of Ni(NO$_3$)$_2$·6H$_2$O After each such mixed solution is prepared, there is added to each solution 50 ml of 28% NH$_4$OH, and the resulting mixture is stirred for 10 to 15 minutes. A blue color develops in the system and some light colored precipitate develops.

Thereafter, to each such resulting solution is added an additional 1500 ml of deionized water having dissolved therein 165 grams of NaOH. A bluish precipitate forms.

Each product precipitate in its vessel with the aqeous reaction mixture is heated to about 70° to 80° C. and held at such temperature for about four hours. The precipitate turns black. Thereafter, the resulting mixture is then cooled to room temperature, and the precipitate collected by filtration.

The precipitate is washed with deionized water several times until the filtrate is below the pH of 10.

Thereafter, the so-washed product in each instance is dried at about 75° to 100° C. for about 16 hours (overnight) to produce a finely divided metal oxide product. Each product is stored under water.

40 grams of each such respective metal oxide product is then taken, such an amount of catalyst being used to aid in evaluating difference between the respective different types of oxides this produced.

To each such 40 gram sample each in an autoclave is added 1 gram of powdered 5% palladium on charcoal catalyst and 880 grams of deionized water. The pH is checked and adjusted if necessary to value of about 9 with sulfuric acid or sodium hydroxide, as the so-checked pH dictated.

Then, the autoclave is pressurized to 250 psig with hydrogen gas and the mixture is stirred while at room temperature until no further pressure drop is observed. This dehydrogenation time usually takes about 4 to 6 hours.

The autoclave is then vented and 420 grams of acrylonitrile is charged thereto which is equivalent to a catalyst loading of about 10% based on copper relative to acrylonitrile starting reactant. The sealed autoclave is then heated to 105° C. Conversions at the end of various respective reaction times for each catalyst are observed. An undoped (pure) copper prepared as described about but without any metal salt additive is also prepared.

TABLE I

| Example No. | Catalyst | % CONVERSION TO ACRYLONITRILE Percent Conversion After | | | |
|---|---|---|---|---|---|
| | | 2 Hrs. | 4 Hrs. | 6 Hrs. | 8 Hrs. |
| 5 | Undoped copper | 19% | 28% | 33% | 38% |
| 6 | Ni-doped copper catalyst | 28% | 40% | 48% | 53% |
| 7 | Lanthanum doped copper catalyst | 32% | 51% | 57% | 62% |
| 8 | Iron doped copper catalyst* | 40% | 54% | 62% | 68% |
| 9 | Aluminum doper copper catalyst | 44% | 58% | 67% | 73% |

*The calculated percent by weight of reduced iron based on combined weight of reduced copper and reduced iron present in this catalyst is 0.47%.

We claim:

1. In a process of the type wherein olefinic nitrile having from 3 through 6 carbon atoms per molecule is hydrolyzed with water in the presence of a copper catalyst under aqueous liquid phase conditions to produce the corresponding olefinic amides, the improvement which comprises using as said catalyst a particulate copper catalyst which has been prepared by the steps of:

(a) first mixing with a first aqueous solution containing a dissolved water soluble cupric salt and a dissolved water soluble metal salt wherein the metal is selected from the group consisting of scandium, titanium, vanadium chromium, manganese, iron, cobalt, nickel, zinc, rare earths and aluminum, said aqueous solution containing a total of from about 25 to 50 weight percent on a total solution basis of said salts and having a weight ratio of said metal to said copper ranging from about 1:250 to 10:100, a second aqueous solution containing on a total second solution basis from about 3 to 28 weight percent ammonia, the total quantity of said second solution so first mixed being sufficient to achieve in the resulting mixture a mole ratio of ammonia to copper ranging from about 0.25 to 0.5 based on total copper present, the quantity of ammonia so mixed being sufficient to effect only a partial precipitation of said salts, (b) secondly mixing with said resulting mixture a third aqueous solution containing on a total third solution basis from about 5 to 40 weight percent dissolved alkali metal hydroxide, the total quantity of said second solution so secondly mixed being sufficient to achieve in the resulting mixture a mole ratio of alkali metal hydroxide to copper ranging from about 2 to 2.5 based on total copper present, the amount of alkali metal hydroxide so mixed being sufficient to effect a substantially complete precipitation of all metal cations present initially in such first aqueous solution, (c) heating the resulting so-formed precipitate to temperature in the range from about 55° to 105° C. for a time which is sufficient to substantially convert said precipitate to metal oxides, (d) separating the resulting precipitate, (e) washing the so-separated precipitate to a pH in the range from about 7.5 to 10, (f) reducing the so-recovered precipitate under aqueous liquid phase conditions in the weight ratio 1:10 to 1:20 of such precipitate (dry weight basis) to water in the presence initially of at least about 10 psig hydrogen and a noble metal of rhenium catalytic agent using a catalyst metal loading of at least about 0.02 weight percent based upon total weight of such precipitate (dry weight basis) at a temperature ranging from about 0° to 150° C. for a time which is substantially completely sufficient to reduce said so-washed precipitate and at a pH of from about 9 to 10.

2. The process of claim 1 wherein said cupric salt is copper sulfate.

3. The process of claim 1 wherein said cupric salt is copper nitrate.

4. The process of claim 1 wherein the metal of said metal salt is aluminum.

5. The process of claim 1 wherein the metal of said metal salt is iron.

6. The process of claim 1 wherein the metal of said metal salt is lanthanum.

7. The process of claim 1 wherein the metal of said metal salt is nickel.

8. The process of claim 1 wherein said heating is conducted within a time ranging from about ½ to 8 hours.

9. The process of claim 1 wherein said reducing is accomplished within a time of from about 1 to 3 hours.

10. The process of claim 1 wherein said initial hydrogen pressure ranges from about 30 to 500 psig.

11. The process of claim 1 wherein the catalyst loading during said reducing is from about 0.05 to 0.1 weight percent based upon the total weight of such precipitate (dry weight basis).

12. The process of claim 11 wherein said catalyst loading ranges from about 1 to 10 weight percent.

* * * * *